United States Patent Office 3,367,935
Patented Feb. 6, 1968

3,367,935
PROCESS FOR THE PREPARATION OF PHOSPHORIC ACID ESTERS
Robert P. Curry, Mobile, and Carlton G. Craddock, Jackson, Ala., assignors to Geigy Chemical Corporation, Greenburgh, N.Y., a corporation of Delaware
No Drawing. Filed Oct. 14, 1965, Ser. No. 496,140
8 Claims. (Cl. 260—251)

This invention relates to an improved catalytic process of preparing esters of phosphoric acid, and more specifically to phosphoric esters of substituted hydroxypyrimidines and substituted phenols.

In one particular aspect, the present invention pertains to the manufacture of esters of dialkoxy phosphoric acids of the following general formula:

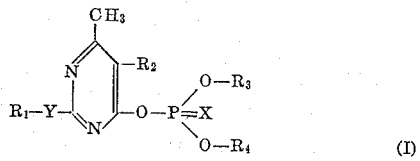

wherein $R_1$ represents alkyl, alkenyl, alkoxyalkyl or alkylmercaptoalkyl radicals, $R_2$ stands for hydrogen, lower alkyl or lower alkenyl radicals, $R_3$ and $R_4$ are lower alkyl radicals, X represents oxygen or sulfur and Y consists of the direct link or sulfur.

These compounds which are disclosed and claimed in U.S. Patent 2,754,243, and particularly the dialkoxy thiophosphates, as for example, O,O-diethyl-O-(2-isopropyl-4-methyl-6-pyrimidyl)-thiophosphate, are of great commercial value by virtue of their well-established insecticidal and acaricidal activity and consequent usefulness in pest control.

The compounds of the above formula have heretofore been produced by reacting an aliphatic phosphoric acid diester halide or a thiophosphoric acid diester halide of the formula:

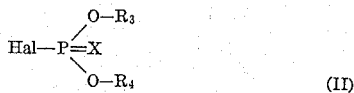

wherein Hal represents chlorine or bromine and X, $R_3$ and $R_4$ are as defined hereinabove, with a hydroxypyrimidine of the formula:

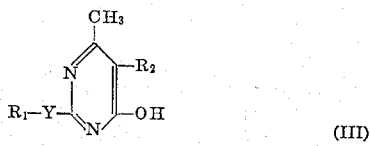

wherein $R_1$, $R_2$ and Y have the significance given to them above, in the presence of benzene as solvent and an alkali metal carbonate as acid binding agent.

As disclosed and claimed in U.S. Patent No. 3,107,245, mercury salts not only serve as good catalysts for the preparation of compounds of Formula I, but also in an analogous manner of compounds of the following formula:

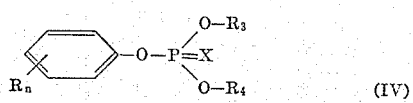

wherein the symbols X, $R_3$ and $R_4$ have the significance ascribed to them hereinabove, R denotes lower alkyl, particularly, methyl and ethyl; halogen, particularly, chlorine and bromine; nitro and methylmercapto, and $n$ is an integer of from 1 to 3. Compounds embraced by Formula IV are likewise well-known pesticides, as for example, O,O-diethyl-O-p-nitrophenyl thiophosphate, O,O-dimethyl-O-p-nitrophenyl thiophosphate, O,O-dimethyl-O-(3-chloro-4-nitrophenyl)thiophosphate, O,O-dimethyl-O-(2-chloro-4-nitrophenyl)thiophosphate, O,O-dimethyl-O-2,4,5-trichlorophenyl thiophosphate, O,O-diethyl-O-p-nitrophenyl phosphate, etc. These esters are prepared by reacting an aliphatic phosphoric acid diester halide (Formula II) with a substituted phenol having the formula:

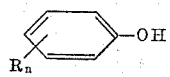

wherein $R_n$ is as defined hereinabove.

Other prior art patents describe as catalysts for the above reactions, cuprous chloride (U.S. Patent No. 2,784,207), cupric chloride (U.S. Patent No. 3,107,246) and the like. Practice of such prior art processes entails some drawbacks and disadvantages including extended reaction times, difficulty of controlling the reactions and relatively poor yields.

It has now been found that the dialkoxy phosphates of Formula I or Formula IV may be produced in high yields of great purity in shortened periods of time by processes utilizing cupric nitrate as the catalyst. Cupric nitrate trihydrate, $Cu(NO_3)_2 \cdot 3H_2O$ or hexahydrate,

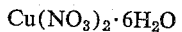

may be used. It has been found that it is practicable to employ amounts ranging from 0.001 to 0.1 mole of catalyst per mole of O,O-dialkyl thiophosphoric acid halide. Although it is possible to use amounts beyond this range, a decrease in quantity of catalyst below the indicated minimum, results in an increase in reaction time and decrease in yield; an increase in amount of catalyst above the indicated maximum has no adverse effects, it is true, but results in no advantage. A more preferred range however is 0.002 to 0.04 mole of catalyst per mole of the acid chloride.

The invention may be illustrated, without limitation thereto, by the following examples:

EXAMPLE I 2-isopropyl-4-methyl-6-hydroxypyrimidine (210 g., 1.38 mole) and 139 g. sodium carbonate (1.31 moles, finely divided light grade, rather than coarse laboratory grade) were charged together with 445 g. of benzene into a two liter, round bottom, three-neck flask equipped with a heating mantle, agitator, thermometer and a water cooled reflux condenser fitted with a Barrett-type water trap. This mixture was refluxed for two hours to azeotropically remove water in the Barrett separator. Then the suspension was cooled to 70° C. and 0.79 g. and (0.0033 mole) of cupric nitrate trihydrate as well as 247 g. (131 mole) of O,O-diethyl chlorothiophosphate was added and the whole reaction mixture refluxed at 88–88.5° C. for two and one-quarter hours at atmosphere pressure. The solution was then cooled, washed with water, twice with 3% sodium hydroxide and with 5% sulfuric acid and again twice with water, and the benzene was removed by vacuum distillation so that the temperature did not exceed 95° C. Benzene was then added to make the total weight 450 g. The desired reaction product, O,O-diethyl-O-(2-isopropyl-4-methyl-6-pyrimidyl)thiophosphate, was then analyzed by the "sulfuric acid extraction method" (i.e., the procedure set forth in "Specifications for Pesticides," World Health Organization, 1956, p. 85, but modified in that the first extraction with distilled water is carried out with one portion of 50 ml. of distilled water and is preceded by extraction with three portions of 50 ml. 3 N sulfuric acid). Yield: 390 g. (94.0% of theory).

EXAMPLE II

Using the same equipment and procedure as described in Example I, 69.5 g. (0.50 mole) of p-nitrophenol, 46 g. (0.288 mole) of sodium carbonate, 640 ml. of toluene, 0.8 g. (0.004 mole) of cupric nitrate trihydrate and 94 g. (0.50 mole) of O,O-diethyl chlorothiophosphate were employed. The reflux time after addition of the chlorothiophosphate and catalyst was 2 hours. O,O-diethyl-O-p-nitrophenyl thiophosphate (149 g., 90.0% yield) was obtained.

In lieu of soda ash, which is the preferred anhydrous acid binding agent, other materials such as potassium carbonate, calcium carbonate, sodium hydroxide and their equivalents may be employed.

It is possible to use in this process instead of benzene as inert solvent, other diluents or slurrying agents such as toluene, xylene, chlorobenzene, and similar aromatic hydrocarbons. However, this list of usable solvents is not exclusive. It has been found that aliphatic hydrocarbons, both cyclic and non-cyclic, can also be employed. In fact, any solvent or inert diluent can be used in the practice of this process as long as it forms as azeotrope with water so that the water formed during the reaction can be removed. Also mixtures of any of such practicable solvents can be employed.

Instead of using the solid cupric nitrate, it may be dissolved in water, ethyl alcohol or other solvents before introduction into the reaction mixture. Where solvents are used, it is preferred that they be kept minimal in amount.

Other suitable changes and variations may be adopted without departing from the spirit and scope of the invention as defined in the claims.

We claim:

1. In a process for the production of O,O-dialkyl-O-aryl phosphates and thiophosphates which comprises reacting a dialkyl phosphoric acid halide of the formula

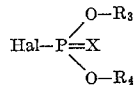

wherein Hal is chlorine or bromine, X is oxygen or sulfur, and $R_3$ and $R_4$ are lower alkyl, with a compound of the formulae

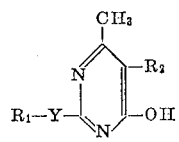

or

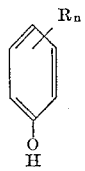

wherein R is lower alkyl, halogen, nitro or methylmercapto, $R_1$ is alkyl, alkenyl, alkoxyalkyl or alkylmercaptoalkyl, $R_2$ is hydrogen, lower alkyl or lower alkenyl, Y is sulfur or the direct link and $n$ is an integer of from 1 to 3, in a hydrocarbon diluent and in the presence of an acid binding agent, the improvement which consists in refluxing said reactants in the presence of a cupric nitrate catalyst.

2. A process according to claim 1, wherein the catalyst is present in the ratio of 0.001 to 0.1 mole per mole of dialkyl phosphoric acid halide.

3. A process according to claim 2, wherein the catalyst is present in the ratio of 0.002 to 0.04 mole per mole of dialkyl phosphoric acid halide.

4. In a process for the production of O,O-dialkyl-O-aryl phosphates and thiophosphates which comprises reacting a dialkyl phosphoric acid halide of the formula:

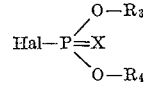

wherein Hal is chlorine or bromine, X is oxygen or sulfur, and $R_3$ and $R_4$ are lower alkyl, with a hydroxypyrimidine of the formula:

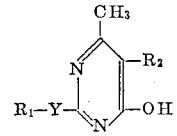

wherein $R_1$ is alkyl, alkenyl, alkoxyalkyl or alkylmercaptoalkyl, $R_2$ is hydrogen, lower alkyl or lower alkenyl, and Y is sulfur or the direct link, in a hydrocarbon diluent and in the presence of an acid binding agent, the improvement which consists in refluxing said reactants in the presence of a cupric nitrate catalyst, the catalyst being present in the ratio of 0.001 to 0.1 mole per mole of dialkyl phosphoric acid halide.

5. In a process for preparing O,O-diethyl-O-(2-isopropyl-4-methyl-6-pyrimidyl)thiophosphate of high yield and purity which comprises reacting substantially equimolar quantities of 2-isopropyl-4-methyl-6-hydroxypyrimide and O,O-diethyl chlorothiophosphate, in a hydrocarbon diluent and in the presence of an anhydrous acid binding agent, the improvement which consists in refluxing said reactants in the presence of a cupric nitrate catalyst, the catalyst being present in the ratio of 0.002 to 0.04 mole per mole of O,O-diethyl chlorothiophosphate.

6. In a process for the production of O,O-dialkyl-O-aryl phosphates and thiophosphates with comprises reacting a dialkyl phosphoric acid halide of the formula:

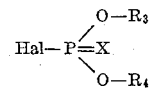

wherein Hal is chlorine or bromine, X is oxygen or sulfur, and $R_3$ and $R_4$ are lower alkyl, with a phenolic compound of the formula

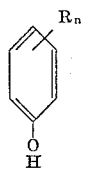

wherein R is lower alkyl, halogen, nitro or methylmercapto, and $n$ is an integer of from 1 to 3, in a hydrocarbon diluent and in the presence of an acid binding agent, the improvement which consists in refluxing said reactants in the presence of cupric nitrate catalyst, the catalyst being present in the ratio of 0.001 to 0.1 mole per mole of dialkyl phosphoric acid halide.

7. In a process for preparing O,O-diethyl-O-p-nitrophenyl thiophosphate which comprises reacting substantially equimolar quantities of p-nitrophenol and O,O-diethyl chlorothiophosphate,
in an aromatic hydrocarbon diluent and in the presence of an anhydrous acid binding agent, the improvement which consists in refluxing said reactants in the presence of a cupric nitrate catalyst, the catalyst being present in the ratio of 0.002 to 0.04 mole per mole of O,O-diethyl chlorothiophosphate.

8. In a process for preparing O,O-diethyl-O-(2-isopropyl-4-methyl-6-pyrimidyl)thiophosphate of high yield and purity which comprises reacting substantially equimolar quantities of 2-isopropyl-4-methyl-6-hydroxylpyrimidine and O,O-diethyl chlorothiophosphate, in an inert diluent adapted to form an azeotrope with water and in the presence of an anhydrous acid binding agent, the improvement which consists in refluxing said reactants in the presence of a cupric nitrate catalyst, the catalyst being present in the ratio of 0.002 to 0.04 mole per mole of O,O-diethyl chlorophosphate.

References Cited

UNITED STATES PATENTS 3,107,245   12/1963   Gaunt _____ 260—973

NICHOLAS S. RIZZO, *Primary Examiner.*